(Model.) 5 Sheets—Sheet 3.

W. F. SMITH & A. COVENTRY.
MACHINERY FOR GRINDING OR SHARPENING DRILLS.

No. 299,433. Patented May 27, 1884.

WITNESSES:
James F. Jobin
Alexander Barkoff

INVENTORS
William F. Smith and
Arthur Coventry
by their Attys
Howson & Son (Model.) 5 Sheets—Sheet 4.

W. F. SMITH & A. COVENTRY.
MACHINERY FOR GRINDING OR SHARPENING DRILLS.

No. 299,433. Patented May 27, 1884.

WITNESSES:
James F. Tobins
Alexander Barkoff

INVENTORS
William F. Smith
and
Arthur Coventry
by their Atty's
Howson & Sons

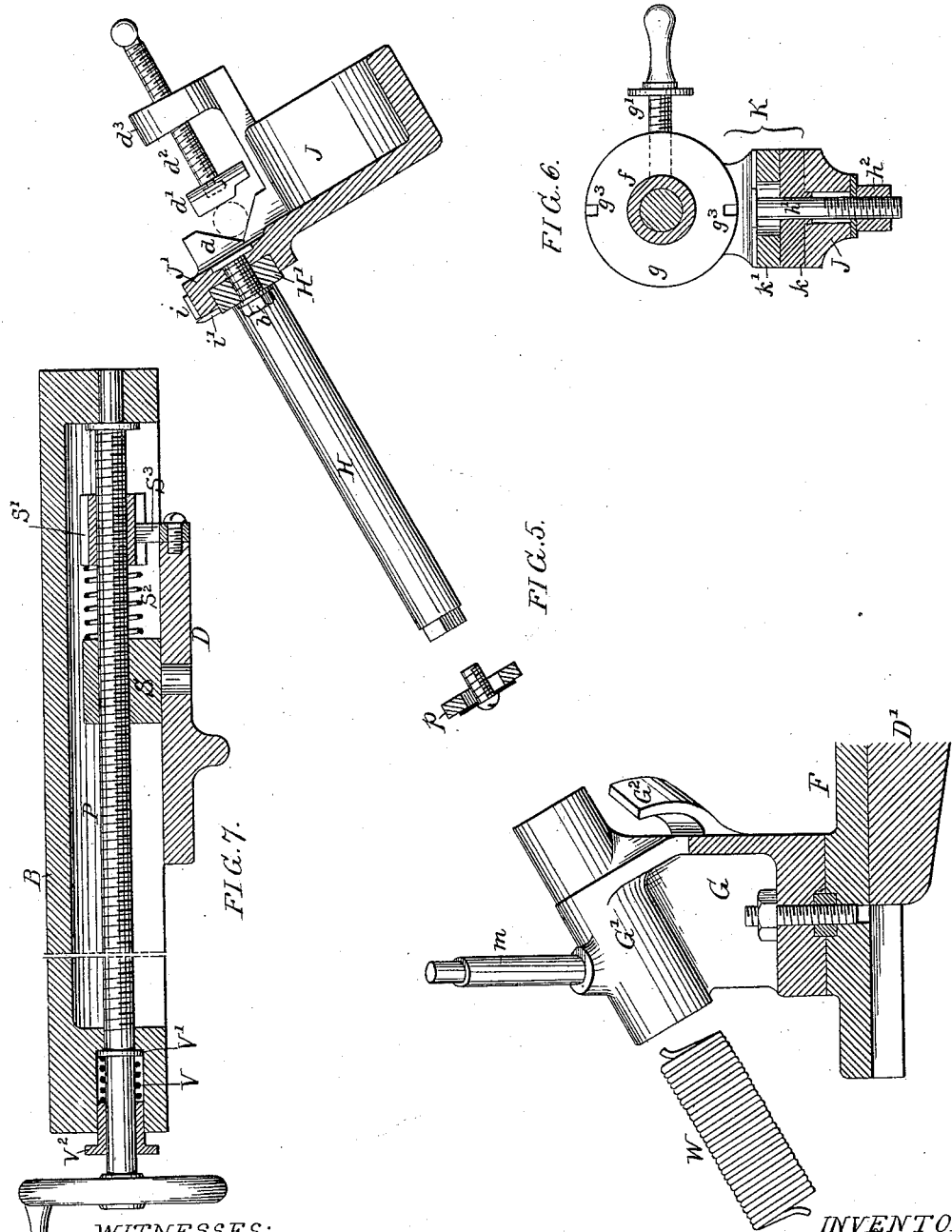

UNITED STATES PATENT OFFICE.

W. FORD SMITH AND ARTHUR COVENTRY, OF SALFORD, MANCHESTER, COUNTY OF LANCASTER, ENGLAND.

MACHINERY FOR GRINDING OR SHARPENING DRILLS.

SPECIFICATION forming part of Letters Patent No. 299,433, dated May 27, 1884.

Application filed July 5, 1881. (Model.) Patented in England July 18, 1879, No. 2,921; in France November 5, 1879, No. 133,534, and in Belgium November 8, 1879, No. 49,784.

*To all whom it may concern:*

Be it known that we, WILLIAM F. SMITH and ARTHUR COVENTRY, subjects of the Queen of Great Britain and Ireland, residing at Salford, Manchester, England, have invented certain Improvements in Machinery for Grinding or Sharpening Drills, (for which we have obtained British Patent No. 2,921, dated July 18, 1879,) of which the following is a specification.

Our invention relates to that class of machines in which the drill-holder is vibrated while the cutting-face of the drill is in contact with the stone, so as to impart the proper radius to said cutting-face, our improvements comprising certain details in the construction of a machine of this class, with the view of providing for the secure retention of the drill in the holder, the ready adjustment of the same to the stone, and the proper lubrication of the latter.

Figure 1:
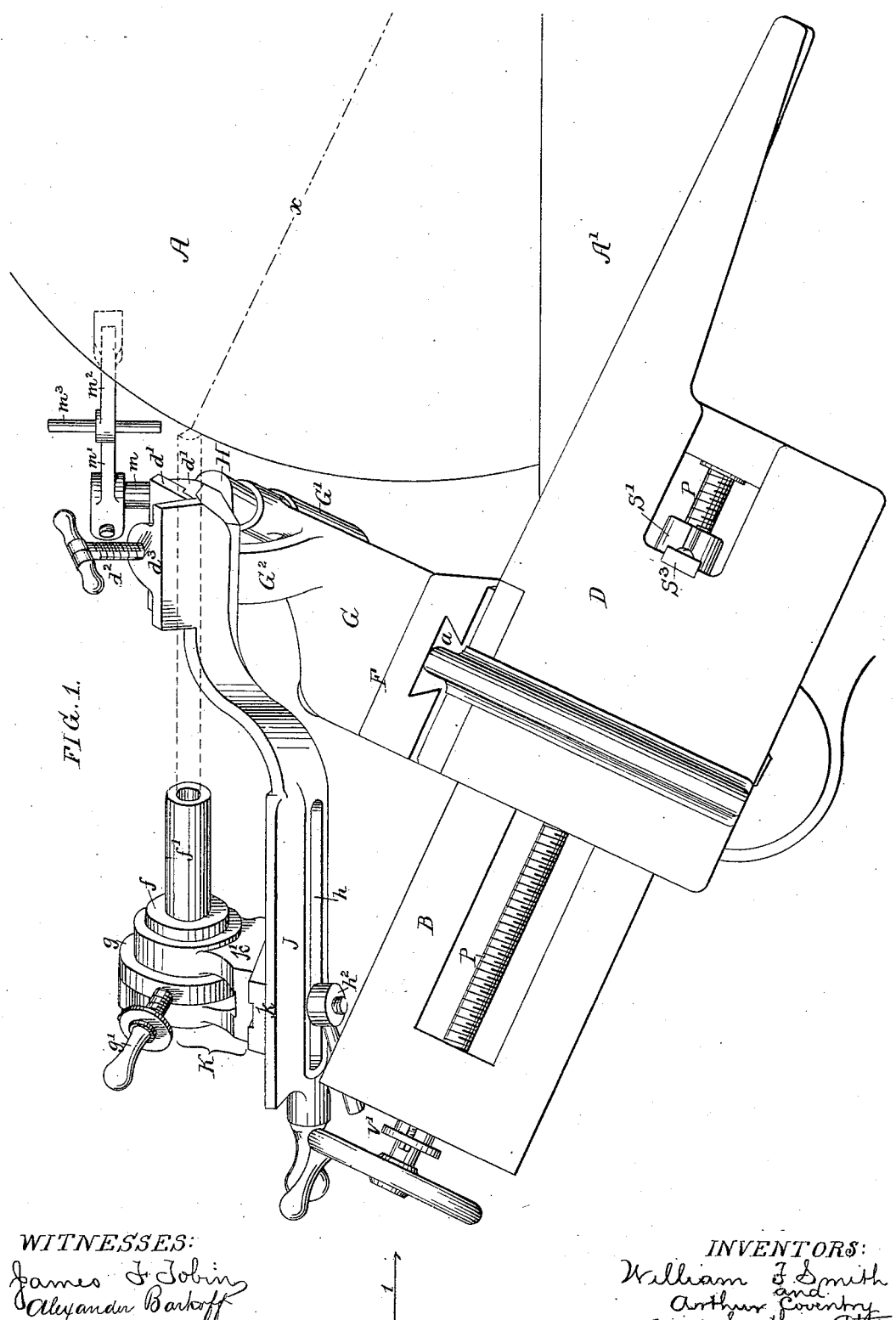
Figure 2:
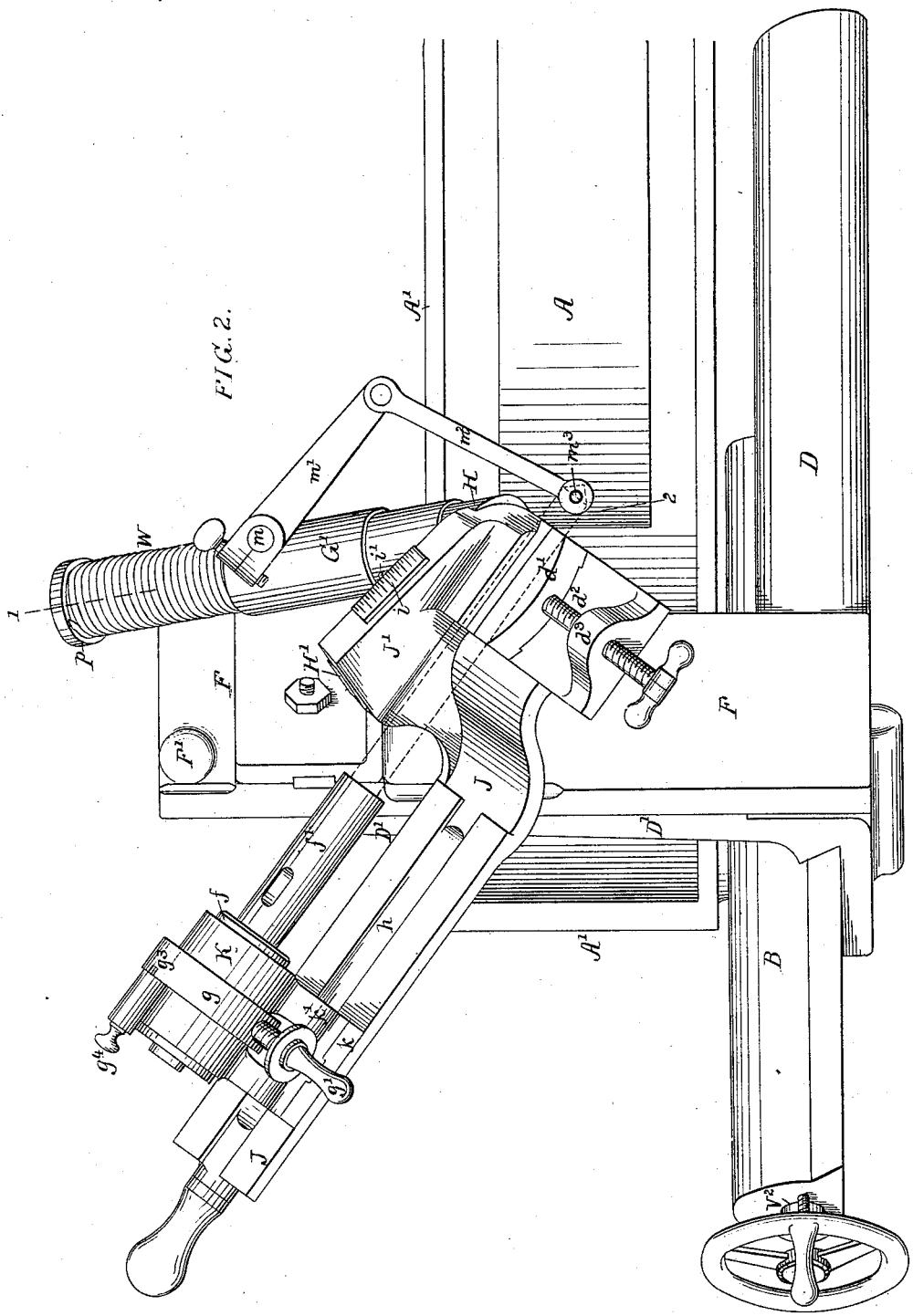
Figure 3:
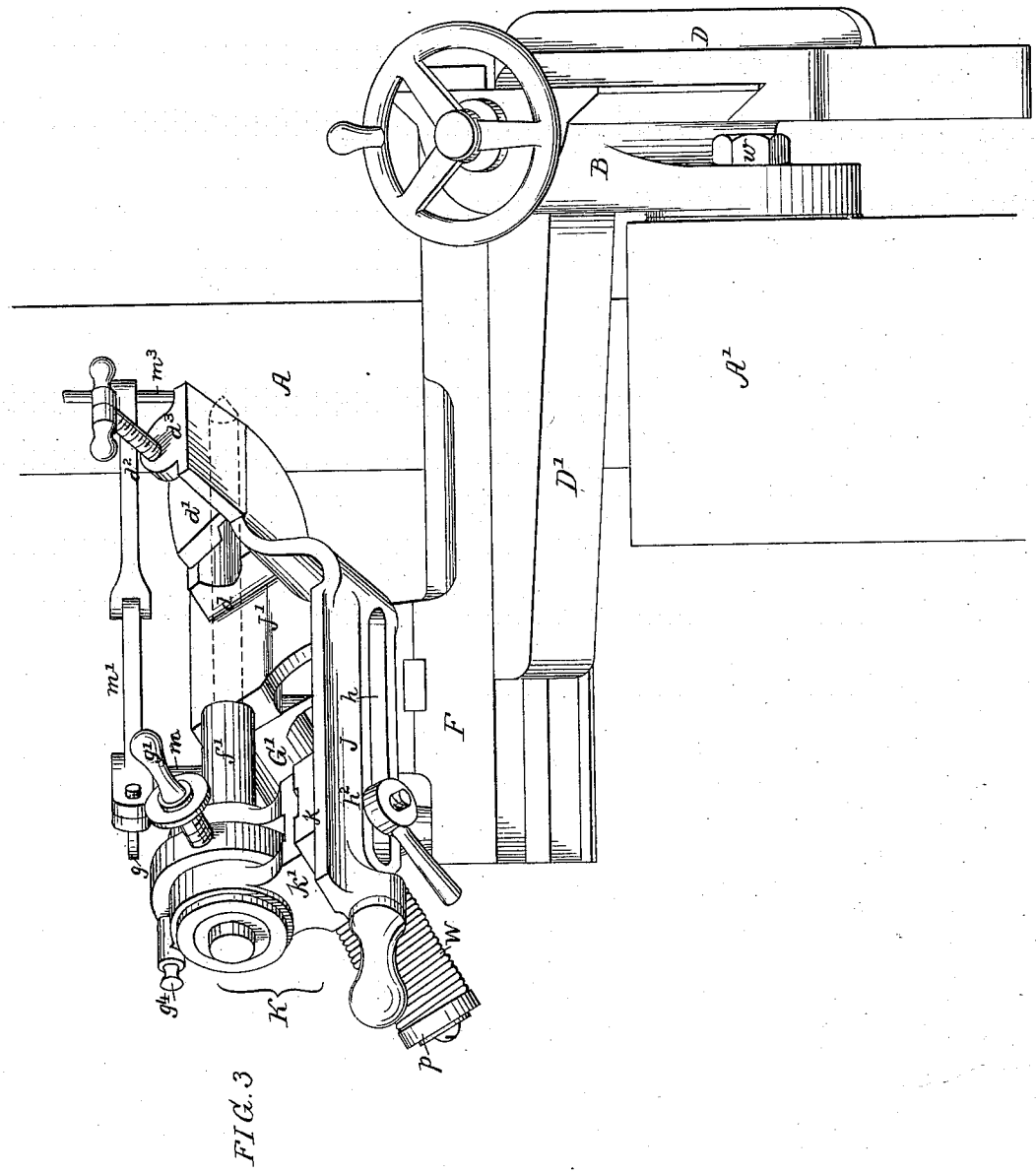
Figure 4:
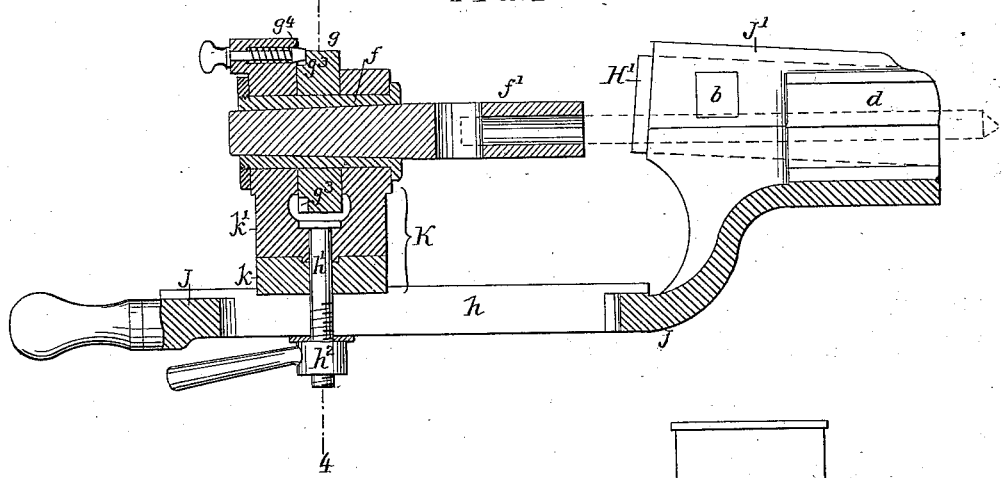

In the accompanying drawings, Figure 1, Sheet 1, is a side view of sufficient of a grinding-machine to illustrate our invention; Fig. 2, Sheet 2, a plan view of the same; Fig. 3, Sheet 3, an end view, looking in the direction of the arrow 1, Fig. 1; Fig. 4, Sheet 4, a longitudinal section of the tool-holder; Fig. 5, Sheet 5, a transverse section on the line 1 2, Fig. 2, with the tool-holder detached; Fig. 6, a transverse section on the line 3 4, Fig. 4; Fig. 7, a longitudinal section of the devices for adjusting the main slide; and Fig. 8, Sheet 4, a general view of the machine on a smaller scale than the other figures, and illustrating some of the features of our invention.

A is an ordinary grindstone, and A' the trough of the same, secured to which is an inclined arm, B, and on the latter is guided a slide, D, the upper end of which has an arm, D', projecting transversely over the trough in front of the stone, and furnished with a guide, $a$, for a second slide, F, the latter having a handle, F', by means of which it can be readily moved transversely on the arm D'.

To the slide F is bolted a bracket, G, forming part of which is a bearing, G', for a spindle, H, the front end of said spindle having an arm, H', to which is secured by means of a bolt, $b$, the tool-holding arm J, a portion, J', of this arm J embracing the arm H', and the latter being slotted for the passage of the bolt $b$, so as to permit the adjustment of said arm J, on the arm H', for a purpose described hereinafter. The arm J has at the front end a V-shaped jaw, $d$, and the drill to be acted upon is clamped between this jaw and a plate, $d'$, swiveled to the end of a screw, $d^2$, which is adapted to a threaded opening in a lug, $d^3$, on the arm J. A head-stock, K, is carried by the arm J, and to this head-stock is adapted a tubular sleeve, $f$, the central opening of which is tapered for the reception of the tapering stem of a chuck, $f'$, carrying the drill. A number of chucks will be required for different-sized drills; but the tapering stems of all of the chucks will be of the same size, for adaptation to the tubular sleeve $f$. Large drills may have tapered stems adapted directly to the sleeve $f$, the chuck being dispensed with.

In order to provide for the ready reversal of the drill after one of its cutting-faces has been ground, the sleeve $f$ is furnished with a ring, $g$, which is contained in a central recess in the head-stock, and has a projecting arm, $g'$, by which it can be readily turned, this arm also forming a set-screw for securing the ring to the sleeve. (See Fig. 6.) The rear face of the ring has opposite notches $g^3$, and guided in a lug on the head-stock is a spring-bolt, $g^4$, which is adapted to enter the upper notch, and thus lock the ring in either of its extreme positions. The chuck $f'$, or the stem of the drill, fits so snugly to the sleeve $f$ that the drill will be turned with said sleeve, the clamping-jaws $d\ d'$, if necessary, being slightly loosened.

In order to permit the adjustment of the head-stock to suit drills of different lengths, the arm J has a longitudinal slot, $h$, for the reception of the clamp-bolt $h'$, a handled nut, $h^2$, on which bears on the under side of the arm J, and serves to secure the head-stock in position after adjustment. As the V-shaped jaw $d$ of the clamp is fixed, lateral adjustment of the head-stock is necessary in order that the drill may be properly centered whatever its diameter; hence we make the head-stock K in two parts, $k$ $k'$, the upper part, $k'$, being adjustable laterally on the base $k$, and having a slot for the reception of the bolt $h'$, as shown in Fig. 6. The bearing G' of the bracket G is inclined, as shown in Fig. 5, and the arm J is set at an angle in respect to the spindle H, as shown in Fig. 3, these angles and that of the slide F being such that the inclined cutting-face of the drill will be parallel with the face of the stone. When the drill has been adjusted so that one of its cutting-faces bears upon the stone, the arm J is vibrated by means of a handle at its outer end, the spindle H turning in the bearing G', and thus causing the cutting-face of the drill to traverse in contact with the stone in the arc of a circle. The slide F is also moved laterally by means of its handle F', so that the drill is carried across the face of the stone, and the wear is distributed evenly throughout the latter. A stop, $G^2$, on the bracket G serves as a support for the arm J, and determines the position of rest of said arm.

It is advisable that the jaws $d$ $d'$ should clamp the drill close to the end of the same, and yet it is necessary that the distance between the end of the drill and the center of the spindle H should be varied in accordance with the radius desired for the cutting-face, some drills having a greater radius than others. For this reason the drill-holding arm J is adjustable on the arm H' of the spindle H, as before described, a gage-plate, $i$, on the portion J' of the arm J serving, in connection with a pin, $i'$, on the arm H', to regulate the adjustment.

It will be observed, on reference to Fig. 4, that the arm H' and guide J' are inclined in respect to the longitudinal center of the clamping-jaw $d$, so that with the longitudinal adjustment of the drill there will also be a certain amount of vertical adjustment, which will cause the axis of the drill to be more or less eccentric in respect to the axis of the spindle H, and thus cause the desired clearance of the cutting-edge of the drill. The drill bears upon the face of the stone A at a point some distance above the center of the same, this point being, in fact, in a radial line, $x$, drawn through the center of the stone and parallel with the guide-arm B of the slide D, so that as the stone wears and the slide is adjusted the point of contact of the drill with the stone will bear the same relation thereto, this relation being such that there will always be a portion of the stone projecting beneath the drill, so that the water used to lubricate the stone will flow back from the drill onto the surface of the stone. The guide-arm B is pivoted to the trough A' by means of a bolt, $w$, so that said arm may be accurately set to insure the proper bearing of the drill on the stone.

To insure the application of the water to the stone at the point where the drill bears upon the latter, we provide the bearing G' of the bracket G with a stud, $m$, to which is clamped one end of an arm, $m'$, to the other end of which is pivoted a second arm, $m^2$, carrying the tube $m^3$, by which the water is directed to the stone, said tube being connected by a flexible pipe, $m^4$, with the valved discharge-pipe $m^5$ of a water-reservoir, L, secured to the hood of the stone. (See Fig. 8.)

By means of the jointed arms $m'$ $m^2$ the tube $m^3$ can be readily adjusted to a point above the point of the drill, and as the slide F is moved laterally to carry the drill across the face of the stone, said tube $m^3$ will be moved with it.

Figure 8:
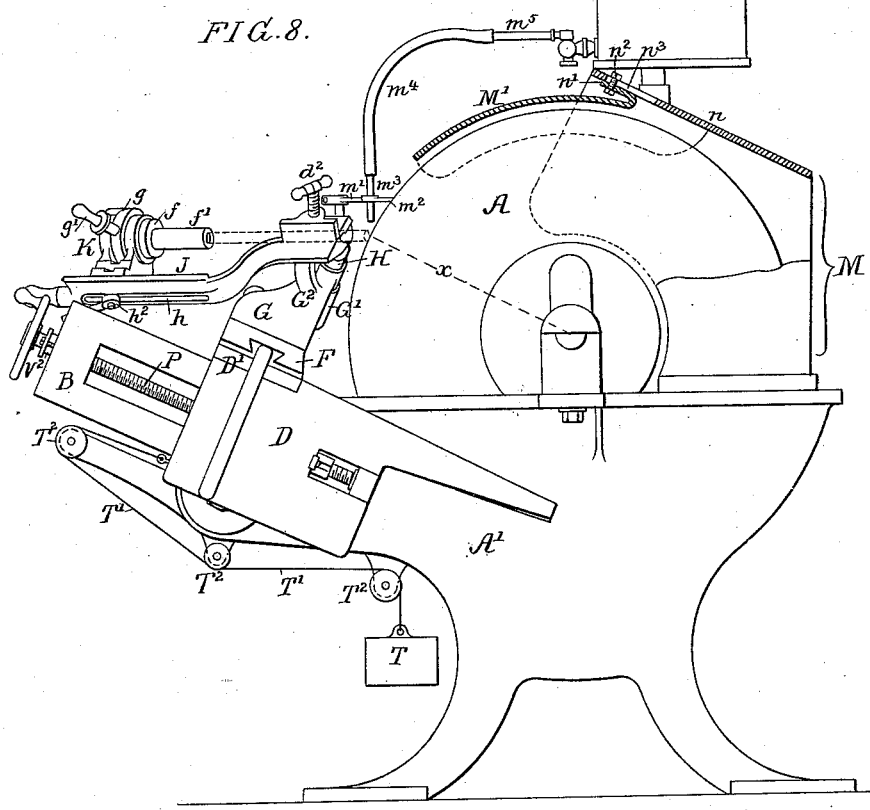

The hood of the stone consists of a rear fixed portion, M, and a front segmental portion, M', Fig. 8. The rear portion has an inclined top, $n$, parallel with the guide-arm B and the radial line $x$, and the segmental front portion, M', has a plate, $n'$, secured to the inclined top $n$ by means of a bolt, $n^2$, which is adapted to a slot, $n^3$, in said top, so that the segmental portion of the hood can be adjusted to follow the stone as it wears, and constantly bear the same relation to the tool which is being ground. The slide D is adjusted on the arm B by means of a screw, P, adapted to fixed bearings on the arm and to a nut, S, secured to the slide D, whereby as the screw is turned the slide will be caused to move up or down on the guide. (See Fig. 7.)

To prevent any lost motion due to play of the nut S on the screw P, a second nut, S', is adapted to the latter, and between this nut and the nut S is interposed a coiled spring, $S^2$, the tendency of which is to force the nuts apart and cause them to bear firmly upon the threads of the screw. The nut S' has longitudinal grooves in its periphery for the reception of a locking-plate, $S^3$, bolted to the slide D. On removing this plate the nut S' can be manipulated so as to compress or release the spring $S^2$, and thus regulate the pressure of the latter upon the nuts. While this device is preferred as a means of preventing lost motion, it is not absolutely necessary, as a weight, T, suspended from a cord, T', connected to the slide D and passing round pulleys $T^2$ on the trough A', so as to exert an upward pull on the slide, as shown in Fig. 8, may be used, if desired. The upper bearing of the screw P contains a spring, V, which bears upon a collar, V', on the screw, and is confined by a follower, $V^2$, this spring serving to retain the screw P in position longitudinally under ordinary circumstances, but permitting said screw to yield when undue upward pressure is exerted upon the slide D.

Our improved grinding-machine may be employed for grinding or sharpening ordinary lathe-tools as well as drills, the slide F in this case being replaced by a slide having a clamp for securing the tool and its holder.

It will be observed, on reference to Figs. 2 and 3, that the spindle H of the tool-holding arm J projects beyond the bearing G', and has at the end a collar, $p$, to which is secured one end of a coiled spring, W, surrounding the spindle, the opposite end of said spring being connected to the bearing G'. The tendency of this spring is to elevate the arm and in a measure counterbalance the weight of the same, so as to facilitate the vibration of the arm by means of one hand.

We claim as our invention—

1. The combination of the stone, the transversely-guided slide F, having a bearing, G', the spindle H, adapted to said bearing, and the arm J, secured to the spindle and provided with means for clamping the drill, as set forth.

2. The combination of the stone, the transversely-guided slide, F, having a bearing, G', the spindle H, adapted to said bearing, and the arm J, secured to the spindle and having clamping-jaws $d\ d'$, and a head-stock, K, with sleeve $f$, as set forth.

3. The combination of the arm J and its clamping-jaws $d\ d'$ with the head-stock having a sleeve, $f$, and comprising a base, $k$, bolted to the arm, and an upper portion, $k'$, adjustable laterally on said base, as set forth.

4. The combination of the slide F and its bearing G', the spindle H, adapted to said bearing, and the arm J, having drill-holding jaws $d\ d'$ and adjustable on the spindle at an angle in respect to the longitudinal axis of the clamping-jaws, as set forth.

5. The combination of the slide F and its bearing G', the spindle H, adapted to and projecting beyond said bearing, the drill-holding arm J, secured to the end of the spindle, and the coiled spring W, connected at one end to the spindle and at the other end to the bearing, and serving to counterbalance or partially counterbalance the weight of the arm J, as set forth.

6. The combination of the stone A, the slide F, and the pivoted drill-holder having clamps the axis of which is above the center of the stone, with the slide D, carrying the slide F, and guided at an angle parallel with a radial line, $x$, passing through the point at which the drill bears upon the stone, as set forth.

7. The combination of the inclined arm B, the screw P, adapted to bearings therein, the slide D, guided on the arm B, and having a nut, S, adapted to the screw P, and means for elevating the slide and nut and causing the same to have an upward thrust against the screw P, as set forth.

8. The combination of the arm B, the screw P, adapted to bearings therein, the slide D, guided on the arm and having a nut, S, the nut S' on the screw P, and the spring $S^2$, interposed between the two nuts, as set forth.

9. The combination of the arm B, its screw P, the slide D, having a nut, S, the grooved nut S', locking-plate $S^3$, and the spring $S^2$, as set forth.

10. The combination of the stone with the hood comprising the rear portion, M, with inclined top $n$ and the front segmental portion M', adjustable on said inclined top $n$, as set forth.

In testimony whereof we have signed our names to this specification in the presence of two subscribing witnesses.

W. FORD SMITH.
ARTHUR COVENTRY.

Witnesses:
WILLIAM METCALFE,
CHARLES SIBZEY.